March 12, 1957 H. A. SOUTHERLAND 2,784,424
TRAILER BOAT
Filed June 21, 1955 3 Sheets-Sheet 1
Fig. 1
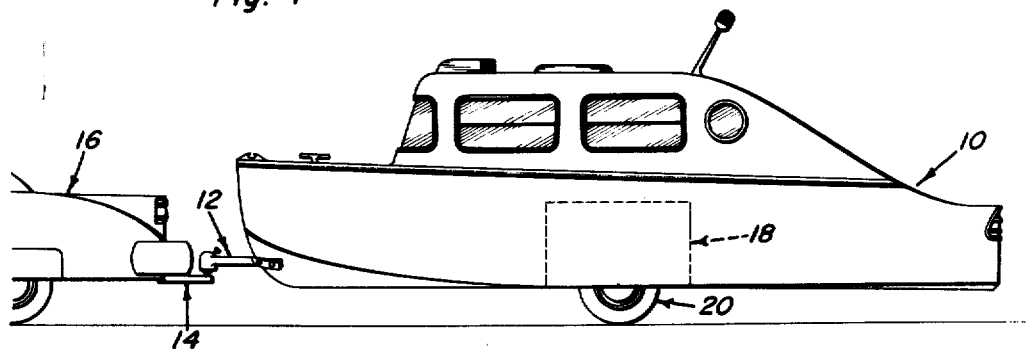
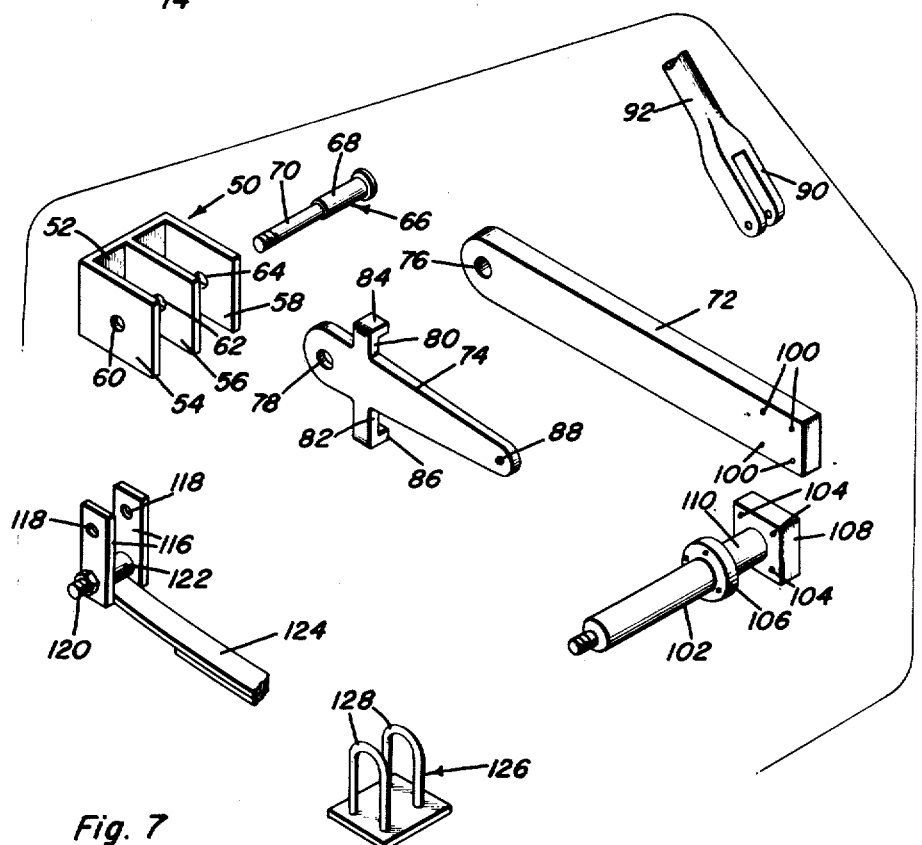
Fig. 7
Hetsel A. Southerland
INVENTOR.
BY
Attorneys March 12, 1957     H. A. SOUTHERLAND     2,784,424
TRAILER BOAT Filed June 21, 1955            3 Sheets-Sheet 2

Hetsel A. Southerland
INVENTOR.

March 12, 1957 H. A. SOUTHERLAND 2,784,424
TRAILER BOAT
Filed June 21, 1955 3 Sheets-Sheet 3
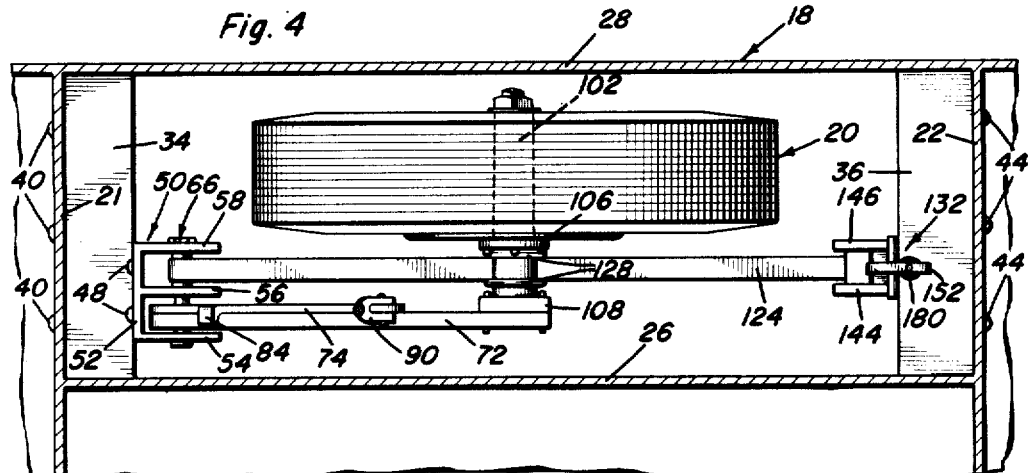
Fig. 4
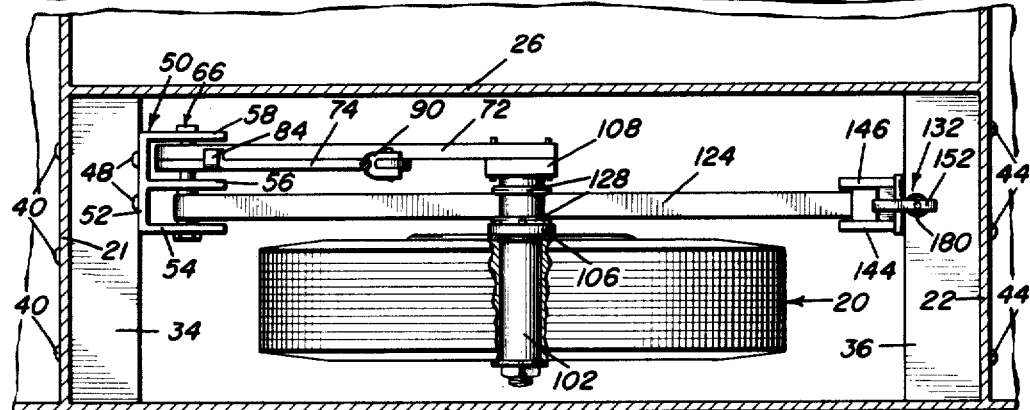
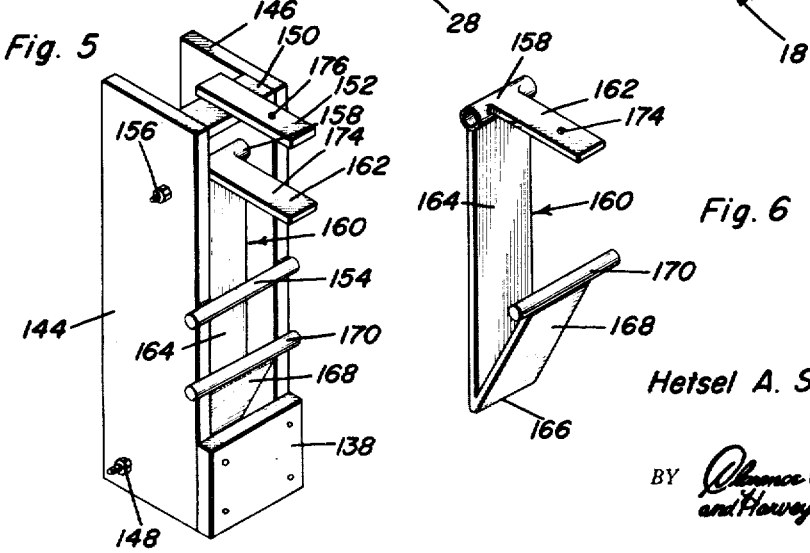
Fig. 5
Fig. 6
Hetsel A. Southerland
INVENTOR.

United States Patent Office 2,784,424
Patented Mar. 12, 1957

2,784,424

TRAILER BOAT

Hetsel A. Southerland, Santa Rosa, Calif.

Application June 21, 1955, Serial No. 516,905

2 Claims. (Cl. 9—1)

This invention relates generally to transportable boat hulls and is more particularly concerned with a vehicular boat hull including retractable wheel assemblies whereby said boat hull is readily transportable and readily usable in the water.

A primary object of invention is conformance with that set forth above is to provide a water-proof wheel nacelle in a trailer boat hull, said nacelle including pivot means pivotally and resiliently supporting a power adjustable wheel assembly which is retractable and extendable by control means located within said boat hull.

A more specific object of invention in conformance with that set forth above is to provide a water-proof nacelle in a trailer boat hull including a forward pivot bracket pivotally supporting mutually parallel stabilizer arm and leaf spring each operatively connected to a stub axle of a wheel assembly, said stabilizer arm being operatively connected to power means in said nacelle, and said spring assembly including a free end portion detachably connected to a spring urged latch means, the power means and latch means being operatively connected to control means external of said nacelle within the boat hull.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the vehicular boat hull connected to a drawing vehicle;

Figure 4 is a sectional view taken substantially on line 4—4 of Figure 2 showing the proximate position of a pair of oppositely disposed wheel nacelles in a boat hull;

Figure 5 is an enlarged perspective view of a latch housing element and pivotal latch therein;

Figure 6 is an enlarged perspective view of the latch element; and

Figure 7 is an exploded perspective view of some of the principal elements comprised in the retractable wheel assembly.

Figure 2:
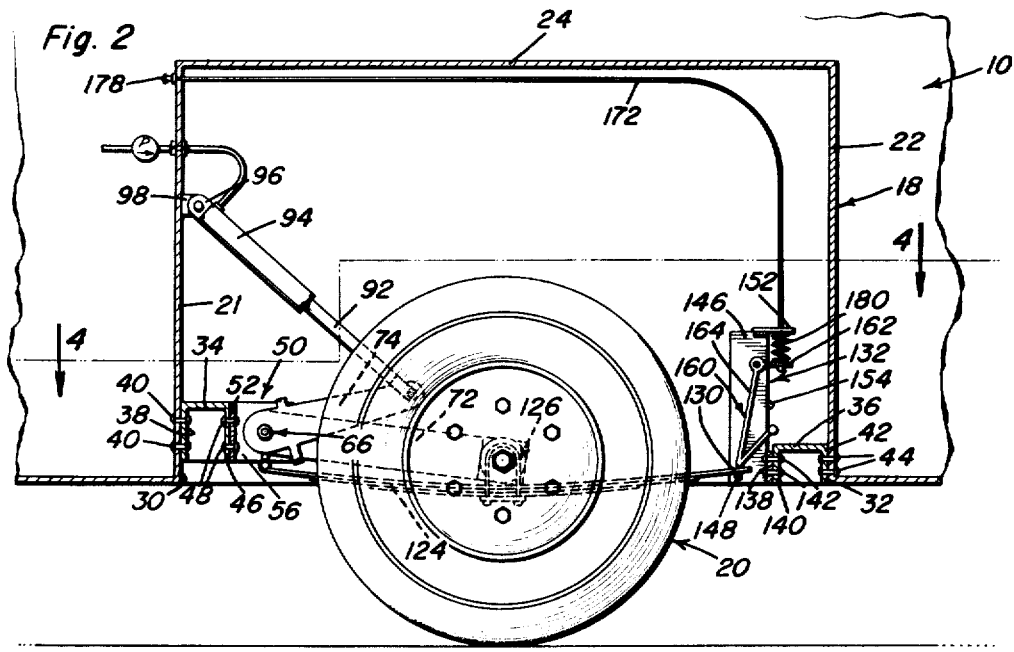
Figure 2 is an enlarged vertical sectional view through one of the water-proof nacelles incorporated in the boat hull with the wheel assembly shown in an extended position.

As seen in Figure 1 there is indicated generally a boat trailer or hull 10 which may include an integral drawbar or hitch member 12 of any suitable character which is detachably connectible to a suitable hitch connection 14 connected on the drawing vehicle 16, the boat hull including a water-proof nacelle or recess portion 18 which has pivotally supported therein a wheel assembly indicated at 20.

Figure 3:
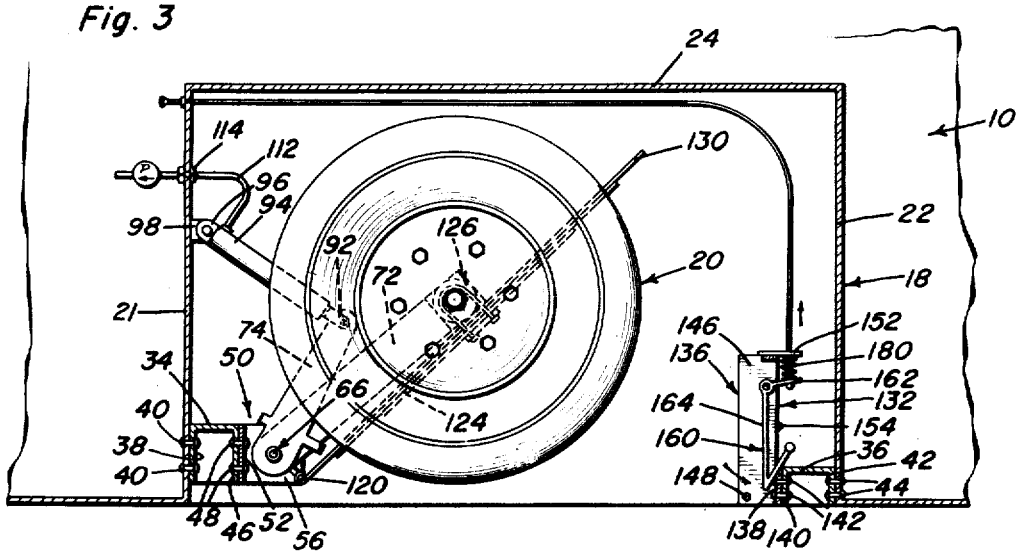
Figure 3 is a view similar to Figure 2 showing the wheel assembly thereof in a retracted position.

As most clearly seen in Figures 2 through 4, the water-proof nacelle 18 includes forward and rear end walls 21 and 22, a longitudinally extending top member 24 and inner and outer side members 26 and 28, respectively. Secured adjacent the lower forward and rear edge portions of the nacelles indicated, at 30 and 32, respectively, are transverse U-shaped channels or frames 34 and 36 which may be inverted as seen in Figures 2 and 3, the frame member 34 having a forward leg portion 38 which is connected to the forward end wall 21 of the nacelle by means of suitable fasteners such as rivets shown at 40. The rear frame member 36 includes a rearwardly disposed flange or leg 42 which is secured to the rear end wall 22 of the nacelle by means of suitable fasteners such as rivets 44. It will be noted that the channel frame members 34 and 36 extend between the side portions 26 and 28 of the nacelles.

Secured to the forward frame members 34 of the rearwardly extending flange 46 thereof by means of suitable fasteners such as rivets 48 in offset relation to the longitudinal center line of the nacelle positioned relative thereto adjacent the inner nacelle sidewall 26 is a pivot bracket element 50. The pivot bracket 50 includes a bight flange portion 52 which is secured to the previously mentioned rear leg or flange 46 of the frame member 34, said bight portion having extending rearwardly therefrom three spaced vertical flange portions 54, 56 and 58 which respectively include aligned aperture portions 60, 62 and 64 for receiving a horizontal pivot bolt 66. The pivot bolt 66 is suitably secured within the pivot bracket 50 and includes pivot portions 68 and 70, the pivot portion 68 thereof extending between the flanges 56 and 58 pivotally supporting thereon a stabilizer arm 72 and adjacent lever element 74 by means of suitable aperture portions 76 and 78 which are normally aligned, the lever member 74 extending upwardly and downwardly therefrom outwardly extending portions 80 and 82 each of which including an outwardly extending lug portion 84 and 86, respectively, which are mutually parallel, and which are engageable with upper and lower portions of the stabilizer arm 72 when the element 74 is pivoted about pivot bolt 66. The element 74 includes at the end removed from the aperture portion 78 an aperture portion 88 providing a means for securing the bifurcated end 90 of a piston rod 92 which is operatively connected and reciprocated by a fluid motor 94 which has the rear end of the housing 96 thereof pivotally connected to a pivot ear 98 on the forward end wall 21 of the nacelle.

The stabilizer arm 74 includes on the end removed from the aperture portion 76 a plurality of aperture portions 100 which provide a means for connecting a transverse stub axle 102 by means of a plurality of cooperating apertures 104, in any suitable manner, the stub axle including thereon a previously mentioned wheel assembly 20. The stub axle includes an annular flange portion 106 intermediately thereon, which provides a means for securing a conventional wheel brake assembly in a fixed position with respect to the wheel assembly 20, and the aperture portions 104 are included in an enlarged inner block portion 108, the block portion 108 and annular flange portion 106 defining a spring shackle support portion 110.

The fluid motor 94 may be either hydraulic or pneumatic, and is controlled by means of a suitable fluid pressure line indicated at 112, said line extending through the forward nacelle wall 21 having any conventional packing or sealing means 114 thereabout where it extends through said wall 21, the line 112 being in communication with a suitable pressure source (not shown). Although a single-acting fluid motor is illustrated in the drawings, it is believed readily apparent that a double-acting fluid motor may be utilized, however, a single-acting fluid motor is usable inasmuch as when the boat hull enters the water the wheel assembly 20 will tend to float to the top of the nacelle being permitted by releasing pressure in the fluid motor 94 whereupon the piston rod will extend into the fluid motor as seen in Figure 3, whereafter the control valve (not shown) is secured and thus any tendency of the wheel assembly 20 to drop out of the nacelle will be in effect prevented by locking the control valve of the fluid motor. It is to be considered within the purview of this invention that suitable equivalent structure may be substituted for the fluid motor, such as a screw crank, winch and cable, etc. Of course, when it is desired to position the wheel assembly 20 as seen in Figure 2, pressure is applied to the fluid motor 94 and a piston contained therein (not shown) which urges the piston rod 92 out of the fluid motor in order that the wheel assembly 20 will be in an extended position as seen in Figure 2.

The pivot portion 70 of the bolt 66 pivotally supports a pair of pivot link element 116 which have a pair of aligned aperture portions 118 which extend over the portion 70 of the pivot bolt, said links 116 having pivotally supported therebetween, a suitable pivot bolt element 120 and end portion 122 of a leaf spring 124. The leaf spring has secured at an intermediate portion thereof a conventional shackle assembly 126 which includes a pair of U-bolt elements 128 which extend over the previously mentioned spring shackle support portion 110 of the stub axle 102.

As most clearly seen in Figure 2, the leaf spring 124 includes a rear free end portion 130 which is detachably secured in a latch assembly 132 to be subsequently described.

Without describing the latch assembly in detail, it will be noted that the wheel assembly 20 is resiliently supported on the leaf spring 124 and the stub axle 102 by means of the shackle assembly 126, and the wheel assembly 20 is carried on one end of the stabilizer arm 72, the other end being pivotally supported on the pivot bolt 66. Thus the wheel assembly 20 is free to oscillate between the limits of the lug elements 86 and 84 of the lever member 74 for providing a comfortable transporting means for the boat hull which will accommodate itself to rough roads, the lever element 74 through its cooperation with the fluid motor 94 will lift the stabilizer arm 72 by means of the contact of the lug element 86 therewith to the position shown in Figure 3, when the latch assembly 132 is released.

The latch assembly 132 includes a latch housing portion 136 which includes a rear connecting portion 138 which is secured to the forward flange portion 140 of the rear frame element 36, by means of suitable fasteners such as rivets 142, said portion 138 having secured thereto a pair of vertically disposed forwardly extending mutually parallel pivot plate elements 144 and 146. The pivot plates 144 and 146 have extending therebetween transverse abutment bolt element 148 upon which the free end portion 130 of the leaf spring 124 is adapted to be in contact with when the wheel assembly 20 is extended from the nacelle 18, see Figure 2, and includes adjacent the rear edge a transverse upper strap element 150 suitably secured thereacross which has secured thereto a rearwardly extending guide element 152, the purpose to be subsequently described, said plates 144 and 146 also including secured on the rear edges in any suitable manner a transverse stop rod element 154, the purpose of which will also subsequently be described.

The pivot plates 144 and 146 support on a suitable transverse pivot bolt 156 a tubular pivot portion 158 of a pivotal latch element 160 which includes a rearwardly extending lever portion 162 which is normally parallel to element 152 fixedly secured on the upper portion of the pivot plate 144 and 146 as previously described, and further includes a downwardly extending plate element 164 which includes a lower abutment end portion 166 adapted to overlie the free end portion 130 of the leaf spring see Figure 2, which extends in an upwardly and angularly directed rear end portion 168 having secured thereon at the upper edge portion a transverse stop rod portion 170. As seen in Figures 5 and 6 the latch element 160 is pivotally supported on the previously mentioned pivot bolt 156 and may pivot through the limits of the contact of the transverse element 170 with the rear edge of the pivot plates 144 and 146 in one direction, the other limit of the pivotal path thereof being limited by the contact of the vertical plate portion 164 with the transverse rod or stop element 154 on the rear edge of the previously mentioned pivot plates.

A control or force transmitting flexible cable 172, such as a Boudin wire, has one extending through an aperture portion 174 in the lever portion 162 of the pivot element 160, said wire 172 extending through an aperture portion 176 in the element 152 fixed on the pivot plates 144 and 146 as previously described, the aperture 176 being normally in overlying relationship to the aperture 174, the other end of the flexible wire 172 terminating in a suitable handle portion 178 which is accessible in the hull of the boat, inasmuch as the flexible cable 172 extends through the forward wall portion of the nacelle in the boat hull. The spring element 180 is concentrically disposed about the flexible cable 172 between the elements 152 and 162, said spring normally urging the lever element 160 and the abutment portion 166 thereof into overlying relationship relative to the free end portion 130 of the leaf spring to retain the wheel assembly 20 in its extended position, the Boudin wire or flexible force transmitting wire 172 serving to overcome pressure of the spring 180, see Fig. 3, whereupon the element 160 is pivoted about the pivot bolt 156 into the position shown in Figure 3 whereafter the hull is in water the wheel assembly 20 will float into the position shown in Figure 3, or a double-acting fluid motor may be utilized to positively urge the wheel assembly into the position shown in Figure 3.

Various positional directional terms such as "front," "rear," "top," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A retractible wheel assembly comprising front and rear brackets rigidly mounted on one side of a boat trailer, an arm having a pivot at one end on the front bracket for upward swinging from a lowered position and having an axle on its other end, a wheel on said axle swingable upwardly from a lowered position by said arm, a leaf spring vertically swingably attached at one end to said pivot for upward swinging by said arm from a lowered position and attached at its center to said axle, a releasable latch on said rear bracket engaging the other end of said spring to hold the spring and arm lowered, said arm vibrating vertically between its ends in response to vertical flexing of said spring, a lever vertically swingable on said pivot to raise said arm, stop means on said lever for limiting vibration of said arm to limit vibration of said spring, and hydraulic means for swinging said lever.

2. The combination of claim 1, said stop means comprising lugs on said lever overlying and underlying said arm respectively in spaced relation thereto.

References Cited in the file of this patent

FOREIGN PATENTS

| | | |
|---|---|---|
| 698,811 | Great Britain | Oct. 21, 1953 |
| 953,567 | France | May 23, 1949 |
| 4,137 | Great Britain | 1912 |